(12) United States Patent
Moretti et al.

(10) Patent No.: US 10,534,714 B2
(45) Date of Patent: Jan. 14, 2020

(54) ALLOCATING CACHE MEMORY ON A PER DATA OBJECT BASIS

(71) Applicant: HEWLETT PACKARD ENTERPRISE DEVELOPMENT LP, Houston, TX (US)

(72) Inventors: Michael J. Moretti, Mountain View, CA (US); Joel Baxter, San Carlos, CA (US); Thomas Phelan, San Francisco, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 62 days.

(21) Appl. No.: 14/575,976

(22) Filed: Dec. 18, 2014

(65) Prior Publication Data

US 2016/0179682 A1 Jun. 23, 2016

(51) Int. Cl.
*G06F 12/0871* (2016.01)
*G06F 9/50* (2006.01)
*G06F 12/0875* (2016.01)

(52) U.S. Cl.
CPC ........ *G06F 12/0871* (2013.01); *G06F 9/5016* (2013.01); *G06F 12/0875* (2013.01);
(Continued)

(58) Field of Classification Search
CPC ............... G06F 12/0871; G06F 9/5016; G06F 12/0875; G06F 2212/312; G06F 2212/452; G06F 2212/462; G06F 9/50; G06F 17/30; G06F 2212/154; G06F 2212/1041; G06F 12/1045; G06F 2212/608; G06F 2212/1016
See application file for complete search history.

(56) References Cited

U.S. PATENT DOCUMENTS 5,644,751 A * 7/1997 Burnett ................. G06F 12/127
711/113
7,086,063 B1 * 8/2006 Ousterhout ............... G06F 8/45
711/118

(Continued)

OTHER PUBLICATIONS

Xie, Jiong. Improving Performance of Hadoop Clusters. Diss. Auburn University, 2011.*

(Continued)

*Primary Examiner* — Francisco A Grullon
(74) *Attorney, Agent, or Firm* — Hewlett Packard Enterprise Patent Department (57) ABSTRACT

Systems, methods, and software described herein allocate cache memory to job processes executing on a processing node. In one example, a method of allocating cache memory to a plurality of job process includes identifying the plurality of job processes executing on a processing node, and identifying a data object to be accessed by the plurality of job processes. The method further provides allocating a portion of the cache memory to each job process in the plurality of job processes and, for each job process in the plurality of job processes, identifying a segment of data from the data object, wherein the segment of data comprises a requested portion of data and a predicted portion of data. The method also includes providing the segments of data to the allocated portions of the cache memory.

20 Claims, 8 Drawing Sheets

(52) U.S. Cl.
CPC .. *G06F 2212/312* (2013.01); *G06F 2212/452* (2013.01); *G06F 2212/462* (2013.01)

(56) References Cited

U.S. PATENT DOCUMENTS

| | | | | |
|---|---|---|---|---|
| 9,158,540 | B1* | 10/2015 | Tzelnic | G06F 3/06 |
| 2003/0065874 | A1* | 4/2003 | Marron | G06F 17/30011 |
| | | | | 711/100 |
| 2005/0071601 | A1* | 3/2005 | Luick | G06F 12/0862 |
| | | | | 711/206 |
| 2006/0248276 | A1* | 11/2006 | Kilian | G06F 12/0831 |
| | | | | 711/130 |
| 2007/0299809 | A1* | 12/2007 | Browne | G06F 17/30442 |
| 2008/0235457 | A1* | 9/2008 | Hasenplaugh | G06F 12/0842 |
| | | | | 711/130 |
| 2008/0250415 | A1* | 10/2008 | Illikkal | G06F 9/5077 |
| | | | | 718/103 |
| 2009/0006755 | A1* | 1/2009 | Illikkal | G06F 11/3409 |
| | | | | 711/126 |
| 2010/0153644 | A1* | 6/2010 | Bauchot | G06F 9/445 |
| | | | | 711/118 |
| 2011/0231857 | A1* | 9/2011 | Zaroo | G06F 9/4881 |
| | | | | 718/104 |
| 2012/0182891 | A1* | 7/2012 | Lee | H04L 43/04 |
| | | | | 370/252 |
| 2012/0297145 | A1* | 11/2012 | Castillo | G06F 12/0868 |
| | | | | 711/138 |
| 2012/0303686 | A1* | 11/2012 | Ananthanarayanan | |
| | | | | H04L 67/2842 |
| | | | | 707/827 |
| 2013/0097680 | A1* | 4/2013 | Bendapudi | H04L 67/2842 |
| | | | | 726/6 |
| 2013/0110961 | A1* | 5/2013 | Jadhav | G06F 15/167 |
| | | | | 709/213 |
| 2013/0132967 | A1* | 5/2013 | Soundararajan | G06F 9/5066 |
| | | | | 718/104 |
| 2014/0067852 | A1* | 3/2014 | Wong | G06F 17/30424 |
| | | | | 707/769 |
| 2014/0137104 | A1* | 5/2014 | Nelson | G06F 9/45558 |
| | | | | 718/1 |
| 2014/0173614 | A1* | 6/2014 | Konik | G06F 9/4881 |
| | | | | 718/104 |
| 2014/0195686 | A1* | 7/2014 | Yeager | H04L 67/1023 |
| | | | | 709/226 |
| 2015/0074672 | A1* | 3/2015 | Yeddanapudi | H04L 47/11 |
| | | | | 718/103 |

OTHER PUBLICATIONS

Wu, Carole-Jean, et al. "PACMan: prefetch-aware cache management for high performance caching." Proceedings of the 44th Annual IEEE/ACM International Symposium on Microarchitecture. ACM, 2011.*

Patterson, R. Hugo, et al. Informed prefetching and caching. vol. 29. No. 5. ACM, 1995.*

Wang, Guanying, et al. "Towards improving mapreduce task scheduling using online simulation based predictions." Parallel and Distributed Systems (ICPADS), 2013 International Conference on. IEEE, 2013.*

Ananthanarayanan, Ganesh, et al. "PACMan: coordinated memory caching for parallel jobs." Proceedings of the 9th USENIX conference on Networked Systems Design and Implementation. USENIX Association, 2012.*

Iyer, Ravi. "CQoS: a framework for enabling QoS in shared caches of CMP platforms." Proceedings of the 18th annual international conference on Supercomputing. ACM, 2004.*

Kasture, Harshad, and Daniel Sanchez. "Ubik: efficient cache sharing with strict qos for latency-critical workloads." ACM SIGPLAN Notices. vol. 49. No. 4. ACM, 2014.*

Mancuso, Renato, et al. "Real-time cache management framework for multi-core architectures." Real-Time and Embedded Technology and Applications Symposium (RTAS), 2013 IEEE 19th. IEEE, 2013.*

Chen, Linchuan, and Gagan Agrawal. "Optimizing MapReduce for GPUs with effective shared memory usage." Proceedings of the 21st international symposium on High-Performance Parallel and Distributed Computing. ACM, 2012.*

* cited by examiner

ALLOCATING CACHE MEMORY ON A PER DATA OBJECT BASIS

TECHNICAL FIELD

Aspects of the disclosure are related to computing hardware and software technology, and in particular to allocating cache buffers for job processes.

TECHNICAL BACKGROUND

A memory cache is an integral computing component that allows data objects to be transparently stored in locations that are more quickly accessible to processing systems. These data objects may include files, documents, pictures, videos, images, or other similar data objects, including combinations, improvements, and portions thereof. In operation, when a process requires a data object, the data object may be retrieved from a storage system, such as a hard disk or solid state drive, and stored in the cache memory to be more quickly accessible to the processing system. In addition to the desired location or portion of the data object, subsequent portions may also be stored in the memory cache as a prediction of future calls to the storage system. Thus, rather than making a plurality of calls, data objects that are likely to be retrieved in succession may be stored in the memory cache using fewer read operations.

Although predicting future memory calls may be beneficial if a single process is being executed, it may be inefficient when multiple processes require data objects for processing. For example, a first process may retrieve a particular data segment that corresponds to the requested and predicted data for the data process. At or about the same time, one or more other processes may also attempt to store data segments in the memory cache to provide quicker access to the data segments. Thus, if each request requires a large portion of the memory cache, data within the cache may be consistently overwritten to provide the necessary data to each of the processes. This consistent overwriting often referred to as thrashing, is inefficient and may slow each of the processes executing on the processing system.

OVERVIEW

Provided herein are systems, methods, and software to allocate cache memory to job processes executing on a processing node. In one example, a method of allocating cache memory to a plurality of job processes includes identifying the plurality of job processes executing on a processing node, and identifying a data object to be accessed by the plurality of job processes. The method further provides allocating a portion of the cache memory to each job process in the plurality of job processes and, for each job process in the plurality of job processes, identifying a segment of data from the data object, wherein the segment of data comprises a requested portion of data and a predicted portion of data. The method also includes providing the segments of data to the allocated portions of the cache memory.

In another instance, a computer apparatus to allocate cache memory to a plurality of job processes includes processing instructions that direct a computing system to identify the plurality of job processes executing on a processing node, and identify a data object to be accessed by the plurality of job processes. The processing instructions further direct the computing system to allocate a portion of the cache memory to each job process in the plurality of job processes and, for each job process in the plurality of job processes, identify a segment of data from the data object, wherein the segment of data comprises a requested portion of data and a predicted portion of data. The processing instructions also direct the computing system to provide the segments of data to the allocated portions of the cache memory. The computer apparatus further includes one or more non-transitory computer readable media that store the processing instructions.

In a further instance, a system to allocate cache memory to a plurality of job processes includes one or more storage media that store a data object to be accessed by the plurality of job processes. The system further includes a computing system configured to identify the plurality of job processes executing on a processing node, and identify the data object to be accessed by the plurality of job processes. The computing system is further configured to allocate a portion of the cache memory to each job process in the plurality of job process and, for each job process in the plurality of job processes, identify a segment of data from the data object that comprises a requested portion and a predicted portion. The computing system is also configured to provide the segments of data to the allocated portions of the cache memory.

This Overview is provided to introduce a selection of concepts in a simplified form that are further described below in the Technical Disclosure. It should be understood that this Overview is not intended to identify key features or essential features of the claimed subject matter, nor is it intended to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Various implementations described herein provide improved allocation of cache memory on a per data object basis. In particular, a processing node, either real or virtual, may include one or more job processes that execute concurrently to provide a particular operation. During the execution of these job processes, the job processes may require access to a particular data object that is too large to be placed in a memory cache for the job processes. Accordingly, rather than providing the entire data object, a service may be used to provide a requested portion of the data object along with a predicted portion of the data object. Thus, rather than doing an individual read for each requested portion of the data object, a single read may be used to gather data for current processing as well as data that is likely to be used in future processing.

Although predicting future-processing data is often useful, in some examples, multiple processes executing on a computing system may cause the data to be consistently overwritten, as different segments of data are required for each of the processes. Here, to combat the overwriting or thrashing of cache memory, each job process initiated on a processing node may be provided with a separate portion of cache memory. Accordingly, rather than consistently overwriting each other, the job processes may be allocated distinct, non-overlapping portions in cache memory for cached segments.

In particular, in the case of a large scale processing framework (LSPF) cluster, such as a Hadoop cluster, various job processes may be initiated on a single processing node. The job processes, sometimes executing as java virtual machines, may each require access to different portions of the same data object. This data object may include a Blob, a Hadoop Distributed File System file, a Swift data object, a GlusterFS file, or any other similar data object. In at least one example, the one or more job processes may be executing within a virtual element that operates on a host computing system. This virtual element, sometimes referred to as a virtual machine or container, abstracts the components of the host and executes independently of other operations and virtual elements executing on the host computing system. To provide the data object to the virtual element, cache memory may be used that is accessible by processes on both the host computing system as well as the virtual element. For example, when a job process on the virtual element initiates a request, a process on the host system may be used to retrieve the requested data and place the data in the cache memory. Once cached, the job process executing within the virtual element may retrieve the requested data and process the data accordingly.

In some examples, the multiple processes initiated on the processing node may require access to a data object that is incapable of being stored in its entirety within the available cache memory. Thus, the data object, which may be many terabytes in size, must be provided to each of the processes in segments to allow the individual operations on the data object. Because each process may require a different portion of the data object, each of the data processes may be allocated a particular portion of the cache memory. Once allocated, a cache service may be used to provide the segments of data to each portion of the cache memory. In some instances, each segment that is provided may include two distinct portions of the data object. The first is a requested portion corresponding to a portion of the data object that was requested by the individual job process, and the second portion of the segment includes predicted data or data that is likely to be requested by the job process in the near future. Thus, rather than providing data as it is requested, the cache service may provide predicted portions of the data to each job process, while preventing thrashing between the processes on the same node.

Figure 1:
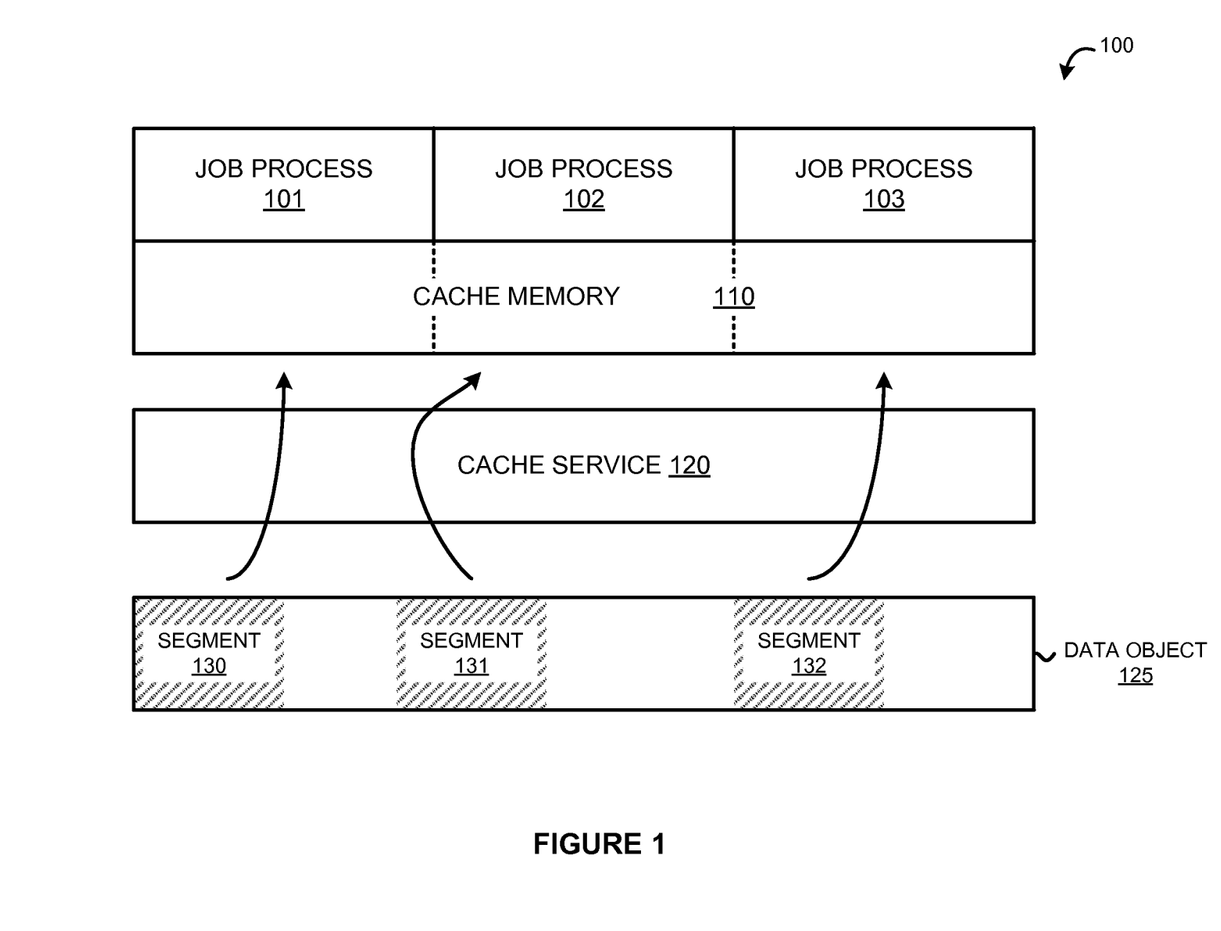
FIG. 1 illustrates a computing environment for allocating cache memory to job processes on a per data object basis.

To further demonstrate the allocation of cache memory to job processes, FIG. 1 is provided. FIG. 1 illustrates a computing environment 100 for allocating cache memory to job processes on a data object open instance. Computing environment 100 includes job processes 101-103, cache memory 110, cache service 120, and data object 125. Each of job processes 101-103 execute on a processing node, which may comprise a physical computing system or a virtual element, such as a virtual machine or container. In some examples, job processes 101-103 comprise java virtual machines, although other job processes may be used in a LSPF node. Further, although a single node is illustrated in the present example, it should be understood that many other nodes might operate on the same data object within a LSPF cluster.

In operation, job processes 101-103 are initiated on the processing node to provide operations on a particular data object. To provide segments of the data object to job processes 101-103, cache service 120 is provided that is used in conjunction with cache memory 110. Once a data object is identified for operation, in this case data object 125, portions of cache memory 110 may be allocated or provisioned for each of the identified job processes. After the portions of cache memory 110 are allocated to job processes 101-103, cache service 120 may be used to provide data segments 130-132 to each of the various processes.

Figure 2:
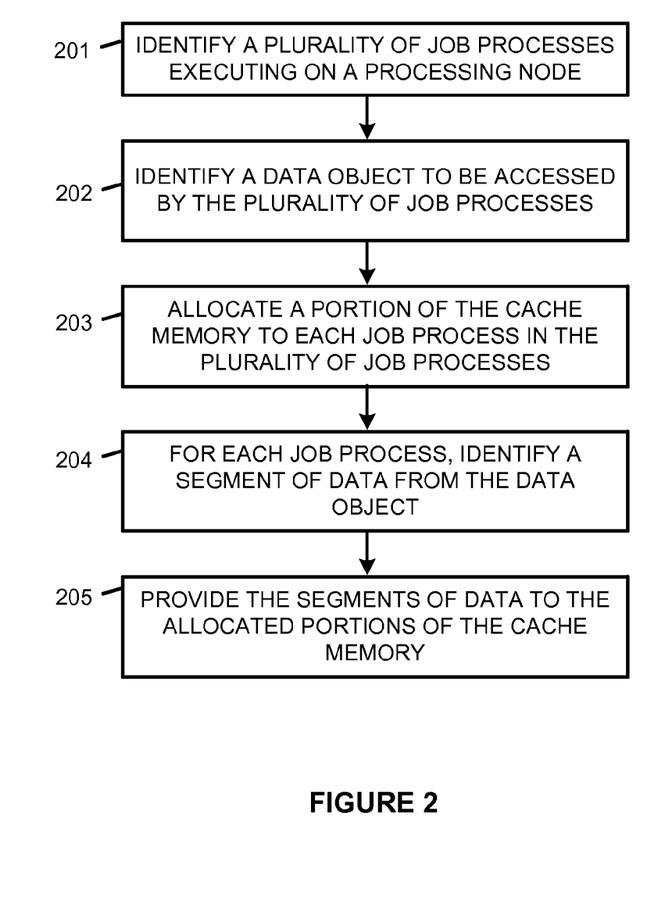
FIG. 2 illustrates an operation of a computing environment to allocate cache memory to job processes on a per data object basis.

As illustrated in FIG. 1, each of the job processes 101-103 requires a different segment of data from data object 125. In some instances, this occurs as job processes 101-103 are generated to execute in parallel with one another. Thus, rather than providing the same content to each of the processes, processes 101-103 may be used to work on distinct segments of the large data object to more quickly provide a response to the job. Included within each of the segments, is a portion requested for initial operation by the process, as well as an anticipated or forecasted portion to the data segment that is likely to be required in the near future. Consequently, rather than providing the required data for each request, future data may also be provided to prevent inefficiency in reading from the large data object. Further, by dividing the cache memory for each of the job processes, each segment provided to the job processes will not overwrite a segment for another job process, To further illustrate the operation of computing environment 100, FIG. 2 is included. FIG. 2 illustrates a method of allocating cache memory to job processes on a per data object open basis. The method includes identifying the plurality of job processes executing on a processing node (201). These job processes may include LSPF job processes for clusters, such as Hadoop clusters or High Performing Computing Clusters (HPCCs). The method further includes identifying a data object to be accessed by the plurality of job processes (202). As described in FIG. 1, job processes may require access to data objects that are too large to fit in the memory cache of the processing node. These data objects may include GlusterFS files, blobs, or any other storage object capable of storing large amounts of data as a single object. Thus, segments of the data object must be provided to each of the job processes to enable operation on the data.

To provide the data, the method further includes allocating a portion of the cache memory to each job process in the plurality of job processes (203). Referring back to FIG. 1, cache memory 110 is divisible into three separate and distinct portions for job processes 101-103. Once divided, the method includes, for each job process in the plurality of job processes, identifying a segment of data from the data object, wherein the segment of data comprises a requested portion of data and a predicted portion of data (204). The method further provides, in response to identifying the segments, providing the segments to the allocated portions of cache memory (205). For instance, as the various job processes 101-103 request data from data object 125, it may be inefficient and time consuming to consistently make storage calls to provide the necessary data. Accordingly, rather than providing the requested portion of data, a predicted portion of data may also be included in the data segment. For example, segment 130 that is provided to job process 101 may include a portion of requested data as well as a predicted portion of data that is likely to be requested in the near future. Similarly, segments 131-132 may be provided to corresponding job processes 102-103 with requested and anticipated portions for processing.

By allocating separate portions of cache memory 110, cache service 120 may more efficiently provide data to each of job processes 101-103. For instance, if cache memory 110 were not divided for each of job processes 101-103, data may be continually overwritten, as each job requires a different segment from data object 125. Thus, although the provided segments may be smaller than a segment that would be provided if the whole cache were available. The dividing of the cache allows memory to be maintained for each of the processes without overwriting each other.

Referring back to the elements of FIG. 1, job processes 101-103 execute on a processing node. The processing node may include communication interfaces, network interfaces, processing systems, computer systems, microprocessors, storage systems, storage media, or some other processing devices or software systems. In some examples, the processing node may comprise an LSPF node that operates in a LSPF cluster including a plurality of LSPF nodes. Further, the processing node may comprise a physical computing system in some examples, or may operate as a virtual element, such as a virtual machine or container. If the processing node comprises a virtual element, the virtual element operates on a host computing system, and abstracts components of the host computing system to provide a segregated environment for the virtual element.

Cache service 120 acts as an intermediary between job processes 101-103 and storage media capable of storing data object 125. Although illustrated as a separate element, it should be understood that cache service 120 might reside wholly or partially on the host computing system for job processes 101-103. Cache service 120 may comprise communication interfaces, network interfaces, processing systems, computer systems, microprocessors, storage systems, storage media, or some other processing devices or software systems, and can be distributed among multiple devices.

Data object 125 may comprise any GlusterFS file, Blob, or other similar data object stored on one or more storage media accessible by cache service 120. In some examples, data object 125 may be a large data object incapable of being cached in its entirety within cache memory 110. Thus, rather than providing the entire data object, segments of the data object may be provided for operations within each of job processes 101-103.

Figure 3:
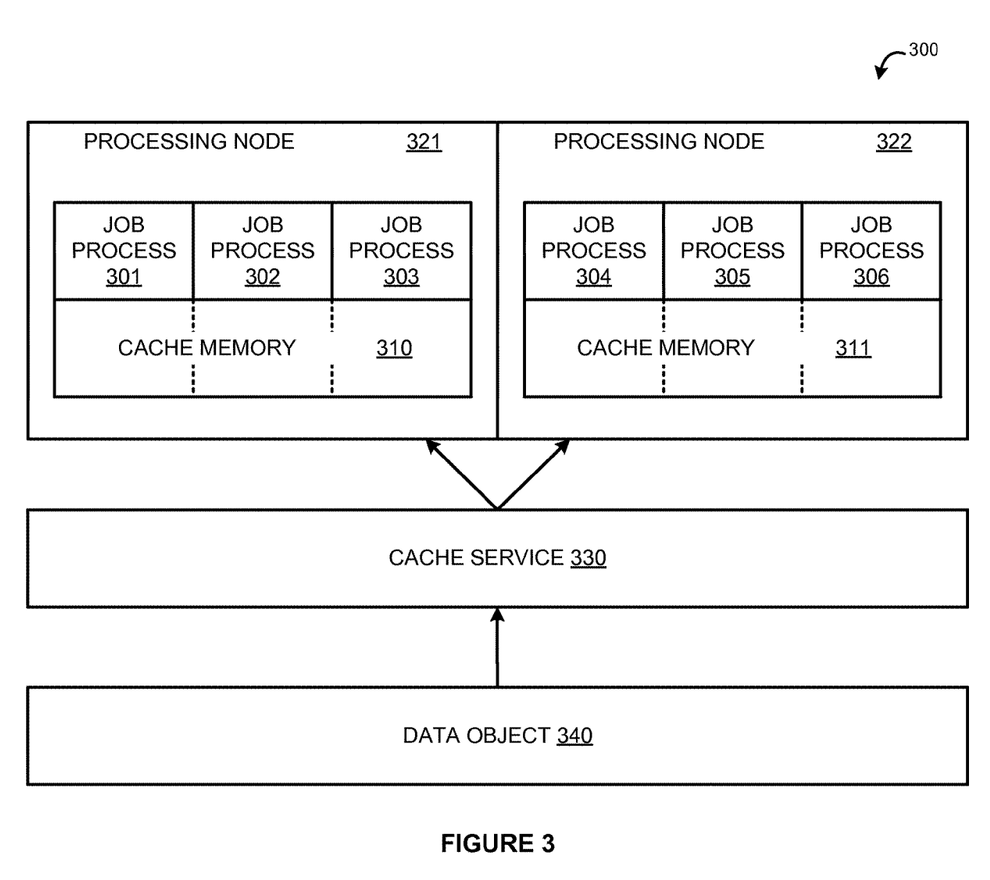
FIG. 3 illustrates an overview of providing segments of a data object to multiple job processes across multiple processing nodes.

Turning to FIG. 3, FIG. 3 illustrates an overview 300 of providing segments of a data object to multiple job processes across multiple processing nodes in a processing system. Overview 300 includes processing nodes 321-322, cache service 330, and data object 340. Processing nodes 321-322 further include job processes 301-306 and cache memory 310-311. Processing nodes 321-322 comprise physical computing systems in the present example, although it should be understood that in other examples processing nodes 321-322 may comprise virtual computing elements.

In operation, job processes 301-306 are generated to, in parallel, process data object 340 to provide a response to a specified job. In response to identifying the job processes, cache memory 310-311 is allocated to each of the job processes to assist in the operations on data object 340. As described herein, data object 340 may be too large to be stored in its entirety in cache memory 310 or cache memory 311. Accordingly, rather than placing the entirety of data object 340 in each of cache memory 310-311, segments of the data object are provided to each of job processes 301-306 based on the requirements for the individual job processes.

In particular, the segments of data that are provided for each of the job processes include a requested portion of data object 340, as well as a predicted portion of data object 340. The requested portion corresponds to the current necessary portion of data required for the job process, or the starting location of data within data object 340. In contrast, the predicted portion of data object 340 comprises a portion that is likely to be required by the job process in the immediate future. Thus, rather than constantly making data calls for each of the job processes, predicted portions may be used to pre-cache selections of data object 340 for processing. Further, by allocating a separate portion of cache memory 310-311 to each of job processes 301-306, each job process is prevented from overwriting a data segment for another process.

Although illustrated as external in the present example, it should be understood that cache service 330 might reside wholly or partially on processing nodes 321-322. Thus, cache service 330 may comprise a distributed cache service located on each of processing nodes 321-322 to provide data segments to the job processes.

Figure 4:
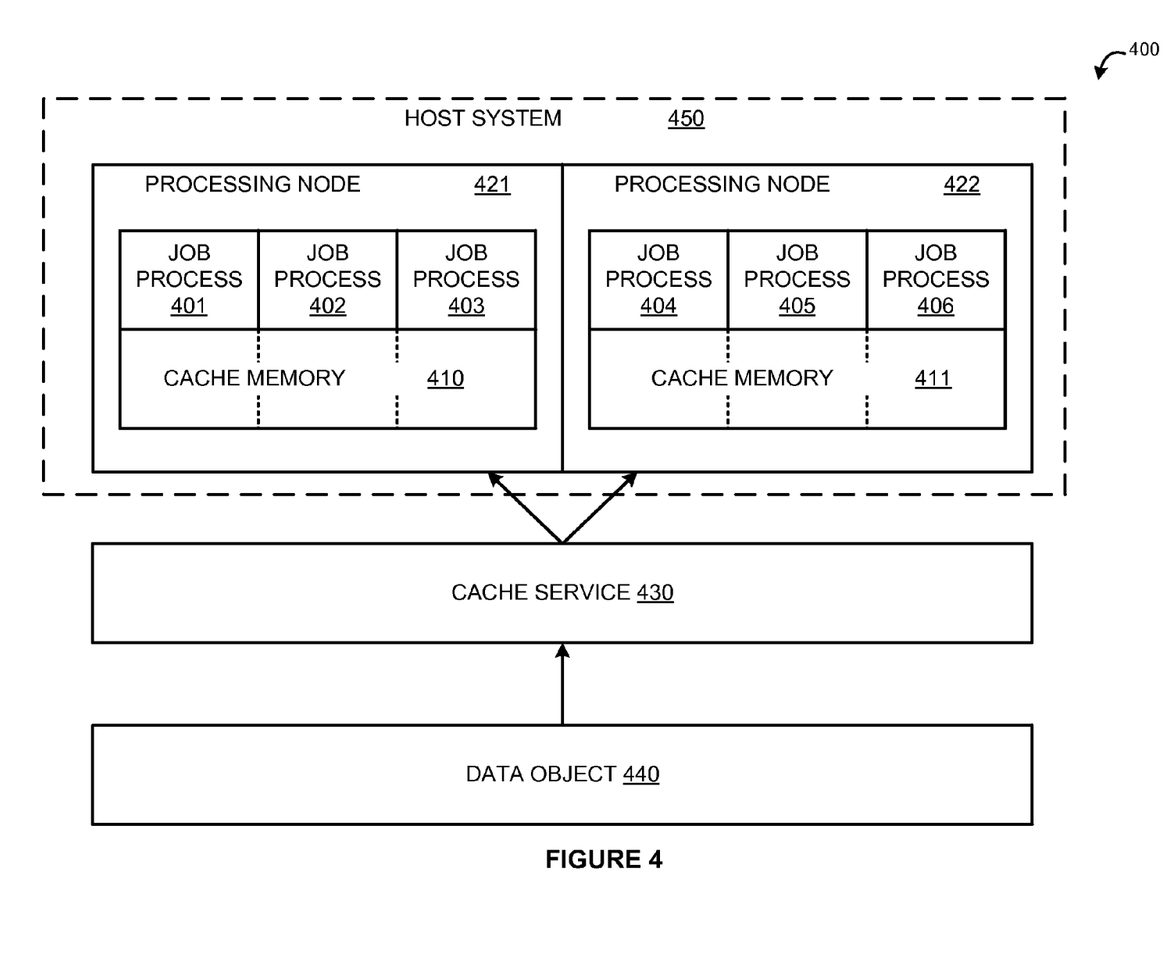
FIG. 4 illustrates an overview of providing segments of a data object to multiple job processes across multiple virtual processing nodes.

Referring to FIG. 4 as an alternative example, FIG. 4 illustrates an overview 400 of providing segments of a data object to multiple job processes across multiple virtual processing nodes. Overview 400 includes host system 450, cache service 430, and data object 440. Host system 450 further includes processing nodes 421-422, which also include job processes 401-406 and cache memory 410-411. Although illustrated separate from host system 450, it should be understood that cache service 430 might be located wholly or partially on host system 450 in some examples.

In operation, virtual processing nodes 421-422 are initiated on host system 450 to provide parallel data processing capability that maximizes the computing resources of host system 450. Host system 450 may comprise a server computer, a desktop computer, or some other similar computing device. As virtual processing nodes 421-422 are initiated on host system 450, job processes 401-406 are generated to provide operations on the data. Once the job processes are initiated and data object 440 is identified for processing, cache service 430 or some other provisioning service allocates cache memory 410-411 to provide segregated memory spaces for each of job processes 401-406. In some examples, processing nodes 421-422 are provisioned with a large scale processing framework, such as Hadoop, HPCC, or some other distributed processing framework. Further, data object 440 may include a Blob, a GlusterFS file, or some other similar large scale processing data object.

Once the cache memory is provisioned and the data objects are identified, cache service 430 may be used in providing segments of data object 440 to each of job processes 401-406. As described previously, data object 440 may comprise a data object that is too large to be cached in its entirety to cache memory 410 or cache memory 411. Accordingly, cache service 430 may be used to provide segments of data to the allocated portions of cache memory 410 to allow processing on smaller segments of data object 440. In some examples, the segments that are provided to the cache memory include requested portions and predicted portions of data. The requested portions include data from a first location requested by the job process, whereas the predicted portion comprises data that would likely be requested in the near future. Thus, rather than incrementally providing data for each of the job processes, data may be provided in segments that prevent unnecessary reads from data object 440.

In some instances, cache memory 410-411 may comprise shared memory that is accessible by one or more processes on host system 450, as well as job processes 401-406 in processing nodes 421-422. This shared memory allows a process, such as cache service 430, to identify and cache data in particular memory locations, but also allow job processes 401-406 to read the data from the same locations. Consequently, rather than writing data twice, first to the host system and then to the virtual element, a single cache write may be used to provide data to each of the job processes.

Figure 5:
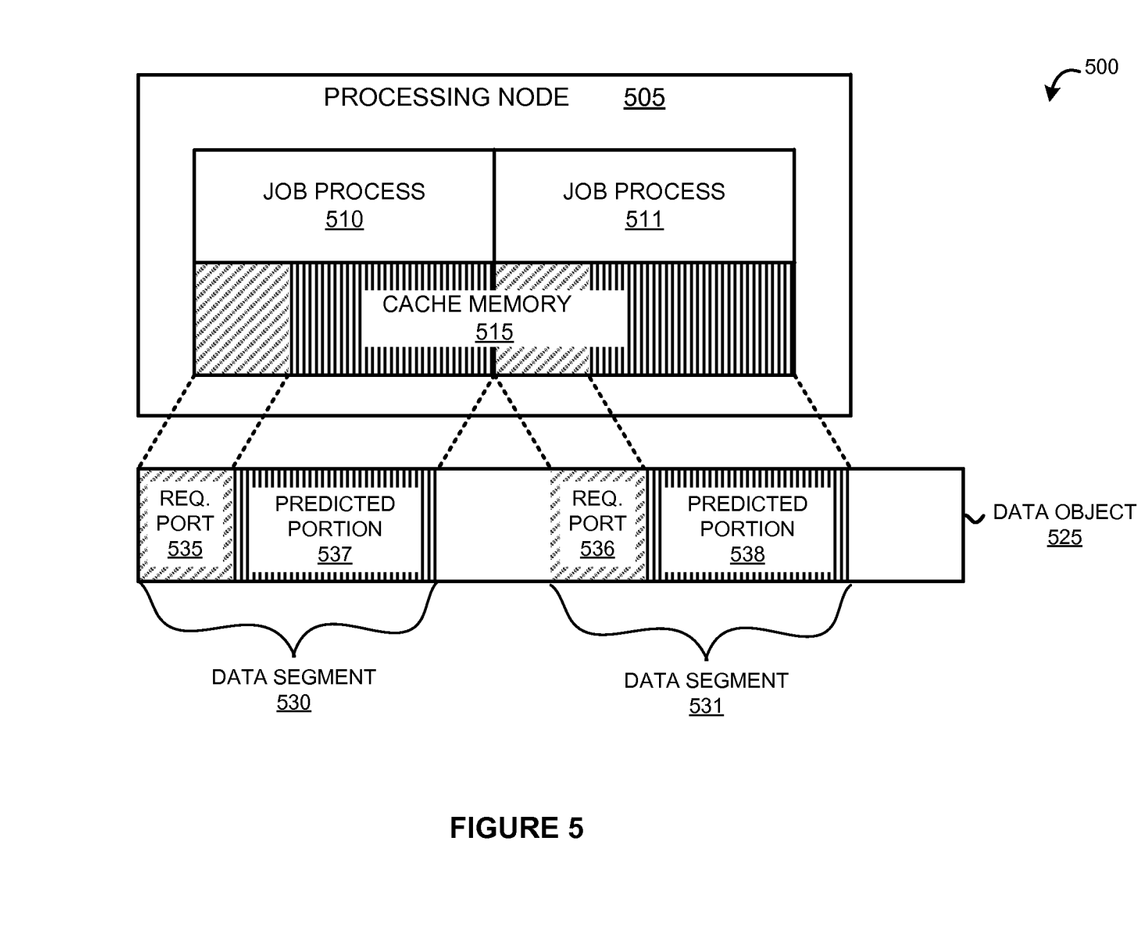
FIG. 5 illustrates an overview of providing a data segment from a data object to an allocated portion in cache memory.

To further illustrate the providing of data to allocated cache memory, FIG. 5 is provided. FIG. 5 illustrates an overview 500 of providing a data segment from a data object to an allocated portion of cache memory. Overview 500 includes processing node 505 and data object 525. Processing node 505 further includes job processes 510-511 and cache memory 515. Cache memory 515 is used to cache portions of data object 525 based on the requirements for job processes 510-511. Although two job processes are illustrated in the present example, it should be understood that any plurality of job processes might execute on processing node 505.

In operation, a user or some other automated process generates a job to be completed in parallel using a plurality of job processes, such as job processes 510-511. As the job processes and desired data object 525 are identified, a cache service or some other allocation process may be used to allocate cache memory 515 to the various job processes executing the job on processing node 505. Once allocated, segments of data object 525 may be provided to the job processes to perform operations using the data.

As illustrated in FIG. 5, data segments 530-531 are provided to job processes 510-511 using cache memory 515. These data segments 530-531 each comprise two parts to provide efficient operations within job processes 510-511, including a requested portion and a predicted portion. Requested portions 535-536 comprise portions of data that are currently being requested for processing in job processes 510-511. In contrast, predicted portions 537-538 comprise data likely to be requested by job processes 510-511 in the near future. Accordingly, rather than continuously waiting for data to be provided from data object 525, data may be cached before it is requested, preventing unnecessary calls to the storage repository storing data object 525.

Here, by allocating cache memory 515 to each of job processes 510-511, job processes may gather data without interfering with each other's operation. For example, if cache memory 515 were not allocated to each of the job processes 510-511, data within the cache may be continually overwritten, as the job processes do not require the same portions of data object 525. As illustrated in FIG. 5, data object 525 is too large to be placed in its entirety within cache memory 515. Accordingly, rather than providing the entire data object, a cache service may be used to provide the requested and predicted portions based on the individual requests of the job processes. Further, by segregating cache memory for each of the jobs, jobs are unable to overwrite each other preventing unnecessary writes and rewrites to the cache.

Figure 6:
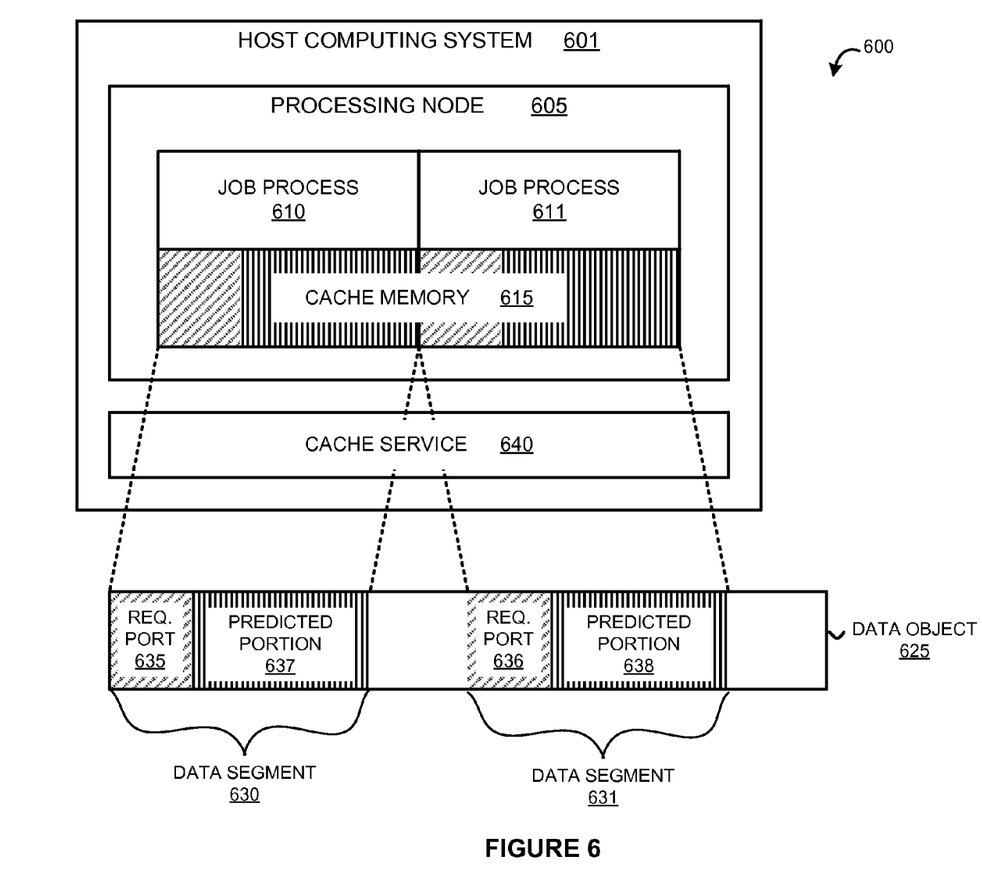
FIG. 6 illustrates a computing environment for providing data to job processes operating on a virtual processing node.

As a further illustration of providing different data portions to job processes, FIG. 6 is included. FIG. 6 illustrates a computing environment 600 for providing data to job processes operating on a virtual processing node. Computing environment 600 includes host computing system 601, which may comprise a server, desktop, or any other similar computing system, and further includes data object 625, which may include any include a GlusterFS, Blob, or some other similar data object stored in a storage repository. Host computing system 601 further includes cache service 640 and processing node 605, which is an example of a virtual element executing within host computing system 601. In this instance, processing node 605 includes job processes 610-611 and cache memory 615 that is used to provide data for processing within job processes 610-611.

In operation, an administrator or some other job allocation process may generate a processing job to be allocated to one or more processing nodes executing on host computing systems. Once initiated and the job processes 610-611 are identified for the task, cache service 640 may be used to provide the required data to each of the job process. Here, cache service 640 identifies that data object 625 is required to be provided to job processes 610-611. Once identified, cache service 640 or some other allocation service may be used to allocate portions of cache memory 615 to prevent overlapping of cache memory 615 between the processes.

For example, as illustrated in FIG. 6, data object 625 is too large to fit in its entirety within cache memory 615. Accordingly, to provide the data required for each of the job processes, cache memory 615 is allocated to each of data processes 610-611. Once allocated, cache service 640 identifies data segments 630-631 for each of the job processes, and provides the data to the cache memory associated with each of the job processes. As depicted, each of data segments 630-631 includes a requested portion and a predicted portion. Requested portions 635-636 correspond to the necessary data requested for job processes 610-611, whereas predicted portions 637-638 correspond to data likely to be requested by job processes 610-611 in the near future. Thus, rather than providing immediately requested data portions to the job processes, predicted portions may be used to provide an increased buffer while limiting the number of storage requests. Further, by providing each of job processes 610-611 with a separate portion of cache memory 615, each portion of data that is provided to job processes 610-611 does not overwrite a portion belonging to the other job process. Accordingly, as illustrated, cache service 640 may cache required portions 635-636 and predicted portions 637-638 in separate locations within cache memory 615. This segregation of the data portions prevents cache thrashing, as cache memory is limited on a per job process basis.

In some examples, cache memory 615 may comprise shared memory that is accessible by at least one process on host computing system 601, as well as job processes 610-611 on processing node 605. For example, cache service 640 may be used to cache data segments 630-631 in storage locations associated with cache memory 615. Once cached, job processes 610-611 may access the data from the storage locations, and perform the requisite operations. Further, although illustrated in the present example as including a single processing node 605 operating on host computing system 601, it should be understood that any number of processing nodes may execute using host computing system 601 as a processing platform.

Figure 7:
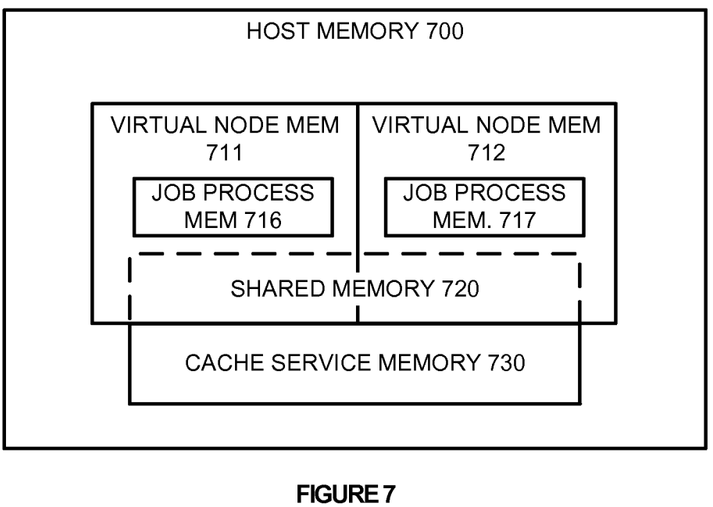
FIG. 7 illustrates host memory that is capable of sharing memory between processes on the host and processes in virtual processing nodes.

To further illustrate the shared memory between a host system and the virtual processing nodes, FIG. 7 is provided. FIG. 7 illustrates host memory 700, which is capable of sharing memory between processes on the host and processes within virtual processing nodes. Host memory 700 includes virtual node memory 711-712, shared memory 720, and cache service memory 730. Virtual node memory 711-712 further includes job process memory 716-717, which comprises memory for job processes executing in the virtual nodes.

In operation, an administrator or some other job generating process generates a job to be processed using processing nodes associated with virtual node memory 711-712. Once the job is allocated to the processing nodes, the job processes executing within the processing nodes gather segments of data from a data object to perform operations using the data object. As illustrated in FIG. 7, shared memory 720 is used as a cache for segments of the data object, and is shared between processes on the host and the processes executing within the virtual nodes. Thus, when a segment is requested for job processes in a virtual processing node, the segment is placed in locations associated with shared memory 720. Once the data segment is stored, the job processes within the virtual nodes may access the data from the same storage locations.

Although illustrated as equal in size in the present example, it should be understood that the shared memory provided for each of the job processes and virtual nodes might be different in some examples. For example, a first job processes may require a higher quality of service than a second job process. Accordingly, the cache service may provide the first job processes with a larger portion of the shared memory.

Figure 8:
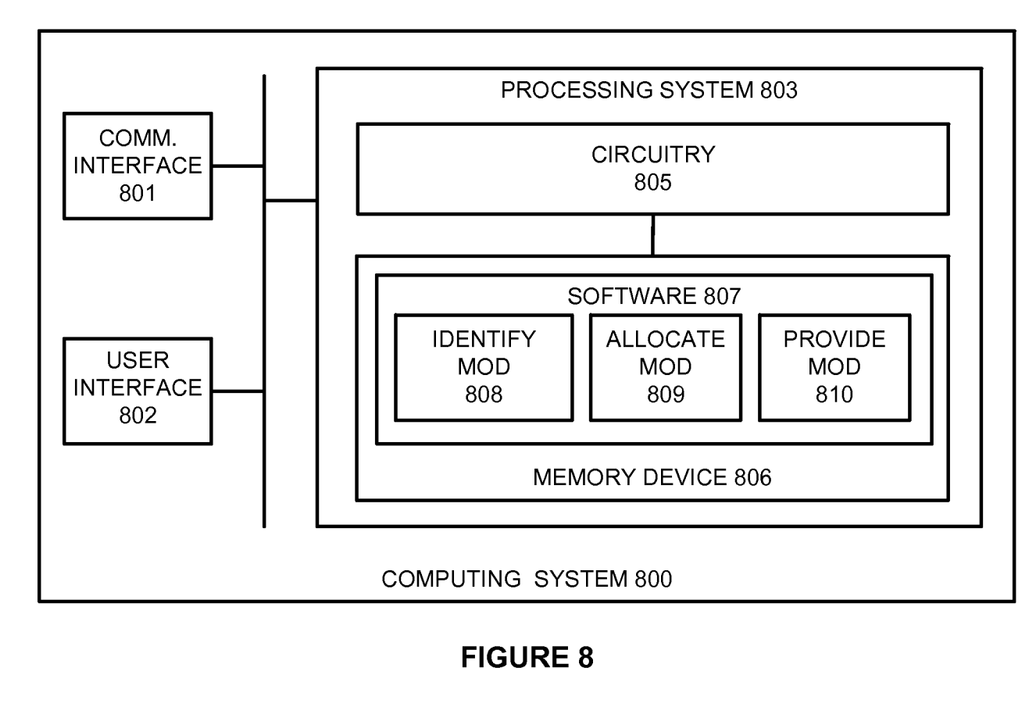
FIG. 8 illustrates a computing system capable of allocating memory to job processes within a processing node.

FIG. 8 illustrates a computing system 800 capable of allocating memory to job processes within a processing node. Computing system 800 is representative of a computing system that may be employed in any computing apparatus, system, or device, or collections thereof, to suitably implement the memory allocation processes described herein. Computing system 800 comprises communication interface 801, user interface 802, and processing system 803. Processing system 803 is communicatively linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof. In some examples, communication interface 801 may communicate with one or more storage media capable storing large data objects for parallel processing within job processes.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes identify module 808, allocate module 809, and provide module 810, although any number of software modules may provide the same operation. Operating software 807 may further include an operating system, utilities, drivers, network interfaces, applications, or some other type of software. In at least one example, operating software 807 further includes one or more job processes executing on one or more processing nodes to provide parallel data processing on a data object. These processing nodes may comprise virtual elements, such as virtual machines, but may also comprise physical computing elements in some examples. When executed by circuitry 805, operating software 807 directs processing system 803 to operate computing system 800 to allocate cache memory as described herein.

In particular, identify module 808 direct computing system 800 to identify a plurality job processes executing on a particular processing node, and further identifies the data object to be processed by the plurality of job processes. Once the job processes are identified along with the data object, allocate module 809 allocates cache memory for each of the job processes to store segments of the data object.

For example, a plurality of job processes may have access to cache memory that is too small to cache an entire data object. Accordingly, rather than providing the entire data object, specific portions of the cache memory may be provided to each of the job processes to prevent data reads from thrashing or consistently overwriting the cache. Without this allocation, each of the job processes initiated for a particular data object may continually overwrite each other as different data is required for each of the processes, resulting in efficient reads from storage media corresponding to the data object.

Once the memory is allocated for each of the processes, segments of the data object are identified for each of the job processes, and provided to the job processes using provide module 810. As described in FIGS. 1-6, each of the data segments provided to the data objects include a requested data portion and a predicted data portion. The requested data portion corresponds to any size of particular data object requested by the job process, whereas the predicted portion corresponds to data that is likely to be requested in the near future. Accordingly, rather than providing each portion of data as it is requested by the job processes, data may be predicted to more efficiently provide the data for processing within the nodes.

In some examples, the cache memory that is used to store the segments of data may include shared memory that is shared between processes on a host computing system and the job processes on a virtual processing node. Thus, a cache service may provide segments of data to the shared memory allocated to each of the job processes, and the job processes within the virtual node may access the data from the same storage locations. Consequently, rather than writing to memory of the host machine and transferring the data into a portion of memory associated with the virtual element, memory may be shared between processes on the host system and the virtual processing node.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
    in a host system, identifying a plurality of job processes executing in a plurality of virtual elements operating on the host system;
    identifying a data object to be accessed by the plurality of job processes;
    allocating a portion of a shared memory of the host system to each job process in the plurality of job processes for processing the data object, wherein a portion size for the portion is determined based on a quality of service associated with the job process, wherein the allocated portions of the shared memory operate as separate and distinct cache memories for the plurality of job processes and include memory locations that are accessible by (i) the plurality of job processes and (ii) a cache service executing on the host system that populates respective allocated portions of the shared memory on behalf of the plurality of job processes;
    for each job process in the plurality of job processes, identifying, by the cache service, a segment of data from the data object, wherein the segment of data comprises a requested portion of data requested by the job process and a predicted portion of data for the job process; and
    providing, by the cache service, each of the segments of data to a corresponding allocated portion of the shared memory.

2. The method of claim 1 wherein the host system comprises a physical computing system.

3. The method of claim 1 wherein the plurality of virtual elements comprises a plurality of containers.

4. The method of claim 1 wherein the plurality of virtual elements comprises a plurality of java virtual machines.

5. The method of claim 1 wherein the host system comprises a large scale processing framework node.

6. The method of claim 1 wherein each segment of data from the data object comprises a unique segment of data from the data object different than any other segment of data provided to other job processes.

7. The method of claim 1 wherein the data object comprises one of a GlusterFS file, a Blob, a Hadoop Distributed File System file, or a Swift data object.

8. The method of claim 1 wherein each portion of the shared memory does not overlap with any other portion of the shared memory.

9. A computer apparatus comprising:
    processing instructions that direct a host system, when executed by the host system, to:
        identify a plurality of job processes executing in a plurality of virtual elements operating on the host system;
        identify a data object to be accessed by the plurality of job processes;
        allocate a portion of a shared memory of the host system to each job process in the plurality of job processes for processing the data object, wherein a portion size for the portion is determined based on a quality of service associated with the job process, wherein the allocated portions of the shared memory operate as separate and distinct cache memories for the plurality of job processes and include memory locations that are accessible by (i) the plurality of job processes and (ii) a cache service executing on the host system that populates respective allocated portions of the shared memory on behalf of the plurality of job processes;
        for each job process in the plurality of job processes, identify a segment of data from the data object, wherein the segment of data comprises a requested portion of data requested by the job process and a predicted portion of data for the job process; and
        provide each of the segments of data to a corresponding allocated portion of the shared memory; and
    one or more non-transitory computer readable media that store the processing instructions.

10. The computer apparatus of claim 9 wherein the host system comprises a physical computing system.

11. The computer apparatus of claim 9 wherein the plurality of virtual elements comprises a plurality of containers.

12. The computer apparatus of claim 9 wherein the plurality of virtual elements comprises a plurality of java virtual machines.

13. The computer apparatus of claim 9 wherein the host system comprises a large scale processing framework node.

14. The computer apparatus of claim 9 wherein each segment of data from the data object comprises a unique segment of data from the data object different from any other segment provided to other job processes.

15. The computer apparatus of claim 9 wherein the data object comprises one of a GlusterFS file, a Blob, a Hadoop Distributed File System file, or a Swift data object.

16. The computer apparatus of claim 9 wherein each portion of the shared memory does not overlap with any other portion of the shared memory.

17. A system comprising:
    one or more storage media that store a data object to be accessed by a plurality of job processes; and
    a computing system configured to:
        identify the plurality of job processes executing a plurality of virtual elements operating on the computer system;
        identify the data object to be accessed by the plurality of job processes;
        allocate a portion of a shared memory of the computer system to each job process in the plurality of job processes for processing the data object, wherein a portion size for the portion is determined based on a quality of service associated with the job process, wherein the allocated portions of the shared memory operate as separate and distinct cache memories for the plurality of job processes and include memory locations that are accessible by (i) the plurality of job processes and (ii) a cache service executing on the computer system that populates respective allocated portions of the shared memory on behalf of the plurality of job processes;

for each job process in the plurality of job processes, identify a segment of data from the data object, wherein the segment of data comprises a requested portion of data requested by the job process and a predicted portion of data for the job process; and provide each of the segments of data to a corresponding allocated portion of the cache memory.

18. The system of claim 17 wherein the plurality of virtual elements comprises a plurality of containers.

19. The system of claim 17 wherein each segment of data from the data object comprises a unique segment of data from the data object different than any other segment of data provided to other job processes.

20. The method of claim 1, wherein said allocating a portion of a shared memory of the host system to each job process in the plurality of job processes for processing the data object prevents one job process of the plurality of job processes from overwriting data cached in the shared memory for use by another job process of the plurality of job processes.

* * * * *